(12) United States Patent
Chang et al.

(10) Patent No.: US 8,022,736 B2
(45) Date of Patent: Sep. 20, 2011

(54) LINE DRIVER WITH TUNED ON-CHIP TERMINATION

(75) Inventors: Menping Chang, Cupertino, CA (US); Soon Lim, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 112 days.

(21) Appl. No.: 12/625,249

(22) Filed: Nov. 24, 2009

(65) Prior Publication Data

US 2010/0066405 A1 Mar. 18, 2010

Related U.S. Application Data

(62) Division of application No. 12/034,632, filed on Feb. 20, 2008, now abandoned.

(51) Int. Cl.
*H03K 5/12* (2006.01)
(52) U.S. Cl. ...................................................... 327/108
(58) Field of Classification Search .................. None
See application file for complete search history.

(56) References Cited

U.S. PATENT DOCUMENTS

| | | | |
|---|---|---|---|
| 5,121,080 A | 6/1992 | Scott, III et al. |
| 6,343,024 B1 | 1/2002 | Zabroda |
| 6,784,708 B1 | 8/2004 | Krenzke |
| 7,119,611 B2 | 10/2006 | Wyers et al. |
| 2008/0252378 A1 | 10/2008 | Hughes |

*Primary Examiner* — Lincoln Donovan
*Assistant Examiner* — Sibin Chen
(74) *Attorney, Agent, or Firm* — Bever, Hoffman & Harms, LLP; Patrick T. Bever (57) ABSTRACT

A line driver includes current sources and resistors that form a bridge circuit in which a bridge resistor is connected between an internal node and ground, and a series resistor connected between the internal node and the driver's output node. The internal node is connected to receive a unit current from a first stage transistor, and the output node is connected to receive an amplified current from a second stage transistor that is N times the unit current. The bridge resistor is formed with a resistance value set such that the voltages at the internal node and the output node are equal, i.e., such that no current flows through the series resistor. The resistance value of the series resistor is thus adjustable to optimize output impedance in a manner independent of the driver's gain. An echo cancellation circuit is utilized to eliminate noise from two associated line drivers.

10 Claims, 5 Drawing Sheets

LINE DRIVER WITH TUNED ON-CHIP TERMINATION

RELATED APPLICATIONS

This application is a divisional of U.S. patent application Ser. No. 12/034,632, entitled "LINE DRIVER WITH TUNED ON-CHIP TERMINATION" filed Feb. 20, 2008.

FIELD OF THE INVENTION

This invention relates to line (output) drivers for integrated circuits (ICs), and in particular to line drivers with on-chip termination.

BACKGROUND OF THE INVENTION

Line (output) driver circuits providing on-chip termination (i.e. using its output impedance as termination) are capable of delivering the same voltage swing with half of the power when compared with line drivers using external resistor termination. This power advantage arises because the on-chip termination line driver does not need to drive the external termination resistor.

Figure 9:
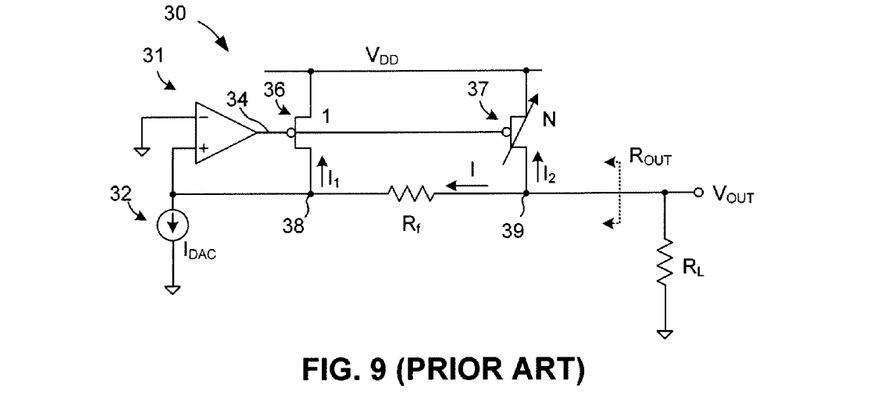
FIG. 9 is a simplified circuit diagram showing a conventional line driver with on-chip termination.

FIG. 9 shows a basic prior art line driver circuit 30 that produces a controlled termination resistance $R_{OUT}$ using voltage and current feedback. Line driver 30 is disclosed in U.S. Pat. No. 5,121,080, which is incorporated herein by reference in its entirety. Line driver 30 includes an amplifier 31 having an inverting input terminal connected to ground (or a common mode voltage), a non-inverting input terminal connected to a current driver 32, and an output terminal connected to a node 34. Current driver 32 includes a digital-to-analog converter (DAC) that generates a current signal $I_{DAC}$ derived from an input signal received from a logic portion of the integrated circuit (not shown) on which line driver 30 is incorporated. Node 34 is connected to drive the gate terminals of a first P-channel transistor 36 and a second P-channel transistor 37. The source-drain path of first P-channel transistor 36 is connected between voltage source $V_{DD}$ and an internal node 38, and the source-drain path of second P-channel transistor 37 is connected between voltage source $V_{DD}$ and an output node 39, at which output voltage $V_{OUT}$ is generated. Input node 38 is connected to the non-inverting input terminal of amplifier 31 and to current driver 32, and a feedback resistor $R_f$ is connected between nodes 38 and 39.

In operation, line driver 30 is implemented to transmit data signals to a selected signal destination by way of a transmission line, which is represented in FIG. 9 by a load resistor $R_L$ that is connected between the output node 39 and ground. First transistor 36 forms the first stage of a current drive circuit that generates a current $I_1$ in response to the output signal generated by amplifier 31, and transistor 37 forms a second stage that is a "replica" of the first stage in that it is also driven by the output signal from amplifier 31, and generates a current $I_2$ that is directly proportional to current $I_1$ of the first stage. A ratio between the two currents $I_1$ and $I_2$ generated by the two drive stages corresponds to an aspect ratio between transistors 36 and 37, which is set such that first transistor 36 is given a value of "1" and second transistor 37 is given a value of "N". The output impedance of amplifier 31 is a function of the current ratio between transistors 36 and 37, as well as the value of the feedback resistor $R_f$. This relationship provides a constant ratio between the current drive and the output current. In essence, current drive is added to the summing node utilizing a replica of the first output stage, with the output impedance depending upon the on-chip feedback resistance $R_f$ such that adjustment of either the feedback resistor $R_f$ or the value of "N" will allow adjustment of the output impedance, as represented below by Equation 1:

$$R_{OUT}=R_f/(1+N) \qquad \text{Eq. 1}$$

Meanwhile, the transimpedance gain of driver circuit 30 is represented by Equation 2:

$$V_{OUT}=I_{DAC}*(N*R_L)/2 \qquad \text{Eq. 2}$$

Note that Eq. 2 is true if $R_f=(1+N)*R_L$, and Eq. 1 is satisfied.

A problem with line driver 30 is that the on-chip resistor $R_f$ is subjective to process variation, and as a result, the output resistance $R_{OUT}$ will vary from chip to chip. Avoiding this problem requires a mechanism for adjusting the output resistance $R_{OUT}$ after fabrication in order to cause output resistance $R_{OUT}$ to match load resistance $R_L$. From Equation 1, to make the output resistance $R_{OUT}$ adaptive, those skilled in the art will recognize that the best approach is to control (adjust) the values $R_f$ or N, or both.

Figure 10:
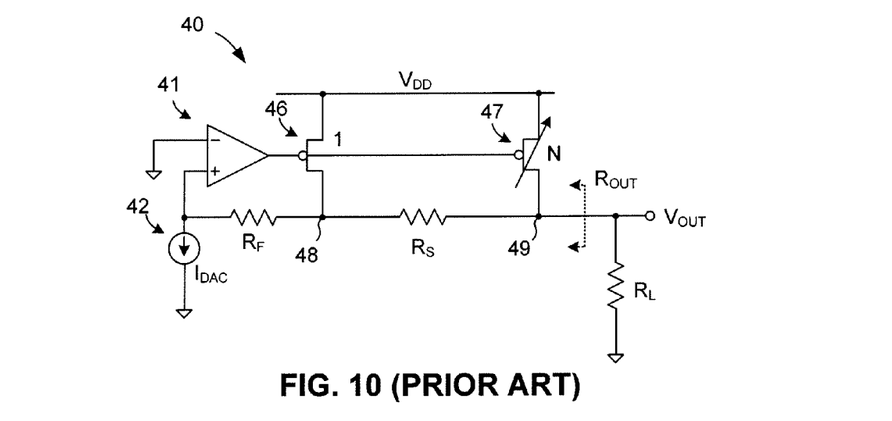
FIG. 10 is a simplified circuit diagram showing another conventional line driver with on-chip termination.

FIG. 10 shows another prior art line driver 40 that achieves a consistent output resistance by utilizing a variable replica stage 47 to adjust the value of N in Eq. 1 (above). Output driver circuit 40 is disclosed in U.S. Pat. No. 7,119,611 issued Oct. 10, 2006, which is incorporated herein by reference in its entirety. Similar to line driver 30 (discussed above), line driver 40 includes an amplifier 41 having an inverting input terminal connected to ground, a non-inverting input terminal connected to a current driver 42, and an output terminal connected to drive the gate terminals of a first stage P-channel transistor 46. The source-drain path of first P-channel transistor 46 is connected to an internal node 48. Variable replica stage 47 includes multiple transistors programmably connected in parallel such that their source-drain paths selectively connected between $V_{DD}$ and output node 49, which in operation is connected to a transmission line represented in FIG. 10 by a load resistor $R_L$. Internal node 48 is connected to the non-inverting input terminal of amplifier 41 and to current driver 42 by way of a feedback resistor $R_F$, and a series resistor $R_S$ is connected between internal node 48 and output node 49. The current through variable replica stage 47 is a function of the number of transistors that are connected in parallel, which is controlled by a value stored in a calibration register (not shown). This value is determined by an analog engine during a calibration operation, which determines the value of the output impedance $R_{OUT}$ as a function of the series resistance $R_S$ and the ratio of transistor 46 and the selected parallel transistors in variable replica stage 47. The ratios of the transistor 46 and the parallel connected transistors in variable replica stage 47 are defined such that a value of "1" is assigned for the transistor 46 and a value of "N" is assigned for the selected transistors in variable replica stage 47, it being understood that the value of "N" can be varied by selecting different combinations of transistors in variable replica stage 47.

Although line driver 40 provides advantages over line driver 30 (see FIG. 9), it still presents a few problems. First, the variable replica stage arrangement provides a transimpedance gain defined in Equation 3:

$$V_{OUT}=I_{DAC}*[(R_F+N*R_L)]/2 \qquad \text{Eq. 3}$$

Under the condition of $R_F>>N*R_L$, as set forth in U.S. Pat. No. 7,119,611, $V_{OUT}=I_{DAC}*R_F/2$. Second, the current I generated by transistor 46 has to flow through series resistor $R_S$, which results not only in a voltage divider, but also a mismatch of $V_{DS}$ (drain to source voltage) between transistor 46 and variable replica stage 47, which causes line driver 40 to produce a nonlinear gain and the distortion of matching ratio N.

Figure 11A:
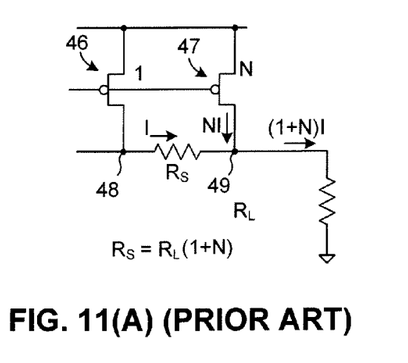
FIGS. 11(A) and 11(B) are circuit diagrams showing simplified representations of the line driver of FIG. 10.
Figure 11B:
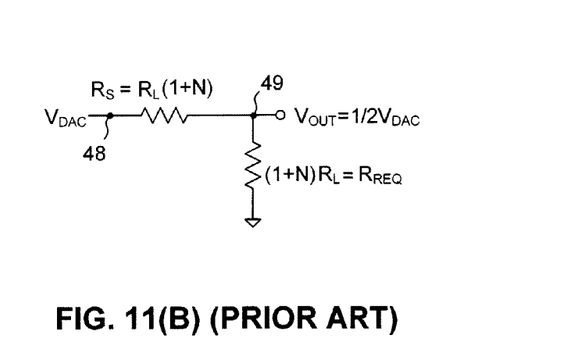

The problems associated with line driver 40 are described with reference to FIGS. 11(A) and 11(B). FIG. 11(A) is a simplified circuit showing portions of line driver 40 and depicts the cause of ½ gain issue. For a unit of current I flowing through transistor 46, there will be a N*I copy flowing out of variable replica stage 47, making the total current flow through load resistance $R_L$ equal to (N+1)*I. This current results an equivalent resistor of (N+1)*$R_L$. Notice that series resister $R_S$ is also equivalent to (N+1)*$R_L$, and as a result a voltage divider is formed that divides the gain by 2. So the output voltage $V_{OUT}$ is half of amplifier output, as shown in 11(B) and set forth in Equation 4:

$$V_{OUT}=\tfrac{1}{2}V_{DAC}=\tfrac{1}{2}I_{DAC}*R_F \qquad \text{Eq. 4}$$

What is needed is a line driver with on-chip termination that overcomes the gain issues and other problems associated with prior art line drivers.

SUMMARY OF THE INVENTION

The present invention is directed to a line driver with on-chip termination that utilizes a bridge resistor to improve the transimpedance gain by a factor of two over prior art line drivers, and utilizes an adjustable series resistor to facilitate adjusting the output resistance of the line driver in an efficient manner.

In accordance with a first embodiment, an IC includes line driver for generating a predetermined output voltage on an output node in response to a digital data signal. When implemented in a system, the output node is connected to a transmission line having a load resistance $R_L$, which is know (e.g., 75Ω (Ohms)). The line driver utilizes a current driver and an amplifier to generate an output control signal in response to the digital data signal. The output control signal is connected the gate terminals of a first stage transistor and a second stage transistor. The source-drain path of the first stage transistor is connected between a voltage source and an internal node, and the source-drain path of the second stage transistor is connected between the voltage source and an output node, at which output voltage is generated. The first stage transistor generates a first current at the internal node in response to the output control signal, and second stage transistor generates a second current at the output node that is directly proportional to the first current. A ratio between the two currents generated by the two drive stages corresponds to an aspect ratio between the first and second stage transistors, which is set using known techniques such that the first stage transistor is given a unit value of "1" and the second stage transistor is given a value of "N" (e.g., ten). The series resistor is connected between the interior node and the output node, and a feedback resistor is connected between the interior node and a non-inverting input terminal of the amplifier.

According to an aspect of the present invention, a bridge resistor is connected between the internal node and the common mode (ground), and is provided with a resistance value selected such that the an internal voltage generated at the internal node is equal to the predetermined output voltage generated at the output node, whereby substantially zero current flows between the output node and the internal node through the series resistor. In one specific embodiment in which current through the feedback resistor is insignificant, the resistance value of the bridge resistor is substantially equal to the aspect ratio value "N" times the load resistance $R_L$. In another embodiment, where feedback resistance is not negligible, the resistance value of the bridge resistor is matched with the combined resistance value of the feedback resistor and the load resistance to produce the desired internal node voltage. By providing the bridge resistor, a bridge-type circuit is formed such that the output voltage is the same as the internal node voltage generated by the first stage transistor (i.e., there is no factor two degradation as in conventional line drivers), and the resistance value of the series resistor does not affect the output voltage, which makes the adjustment of the output resistance completely independent of the driver's gain.

According to another aspect of the present invention, the series resistor is implemented by an adjustable resistor circuit including several parallel trim units that are individually adjustable (trimmable) by way of control signals generated by a control circuit such that the driver's output resistance matches the load resistance. In one embodiment, the series resistor has a resistance value substantially equal to (1+N)*$R_L$, where N denotes the aspect ratio of the first and second stage transistors, and where $R_L$ denotes the load resistance value of the transmission line. In another embodiment, an additional "fixed" series resistor is connected to the output node, and the series resistor has a resistance value substantially equal to (1+N)*($R_L$-$R_{SL}$) where $R_{SL}$ denotes the resistance value of the "fixed" series resistor. The fixed series resistor is added mainly to facilitate the function of echo cancellation, which if the output is a fully differential circuit, it is fully cancelled at the receiving end.

According to another embodiment, a system includes an integrated circuit having two associated line drivers that transmit differential signals onto associated transmission lines, and also includes an echo cancellation circuit that is connected between respective output nodes of the line drivers. The echo cancellation circuit establishes a resistive divider between the output terminals of the line drivers using resistances that are proportional to resistance values of the line drivers and transmission lines, but with a scale up factor. The echo cancellation circuit provides output voltages that are independent of the output signals generated at the line driver output nodes, whereby echo cancellation is achieved.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in line drivers with on-chip termination. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
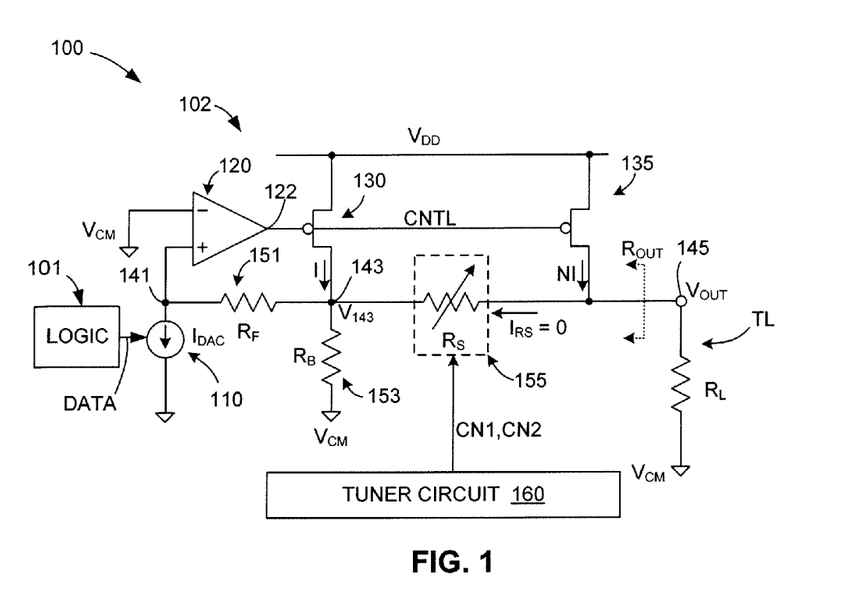
FIG. 1 is a simplified circuit diagram showing an integrated circuit including a line driver with on-chip termination according to an embodiment of the present invention.

FIG. 1 shows a simplified IC 100 including a generalized logic circuit 101 for generating a digital signal DATA, and a line (output) driver 102 for generating a predetermined output voltage $V_{OUT}$ on a output node 145 in response to digital signal DATA. When implemented in a system, output node 145 is connected to a transmission line TL having a load resistance $R_L$, which in the present case is known (e.g., a cable line with a 75Ω (Ohms)). IC 100, which includes both logic circuit 101 and line driver 102, is formed on a semiconductor (e.g., monocrystalline silicon) "chip" using established semiconductor fabrication techniques. In contrast, transmission line TL is formed separate from IC 100, and is connected to an external pin or pad of IC 100, for example, by way of solder connection.

Similar to conventional line drivers, line driver 102 utilizes a current driver 110 and an amplifier 120 to generate an output control signal CNTL in response to digital signal DATA. Current driver 110 includes a digital-to-analog converter (DAC) receives a digital signal DATA from logic portion 101 of IC 100, and generates a current signal $I_{DAC}$ at an input node 141. Amplifier 120 has an inverting input terminal connected to a common mode voltage $V_{CM}$ (or ground), a non-inverting input terminal connected to current driver 110 by way of a input node 141, and an output terminal 122. With this arrangement, amplifier 120 generates an output control signal CNTL on output terminal 122 in response to a digital data signal DATA. Output control signal CNTL is connected to drive the gate terminals of a first P-channel transistor 130 and a second P-channel transistor 135. The source-drain path of first P-channel transistor 130 is connected between voltage source $V_{DD}$ and an internal node 143, and the source-drain path of second P-channel transistor 135 is connected between voltage source $V_{DD}$ and an output node 145, at which output voltage $V_{OUT}$ is generated. Input node 141 is connected to internal node 143 by way of a feedback resistor $R_F$. First transistor 130 forms the first stage of a current drive circuit that generates a current I at internal node 143 in response to the output control signal CNTL, and transistor 135 forms a second stage that is a "replica" of the first stage in that it is also driven by the output control signal CNTL and generates a current NI (N times unit current I) at output node 145 that is directly proportional to current I of the first stage. A ratio between the two currents I and NI generated by the two drive stages corresponds to an aspect ratio between transistors 130 and 135, which is set using known techniques such that first transistor 130 is given a value of "1" and second transistor 135 is given a value of "N". A series resistor 155 is connected between interior node 143 and output node 145.

According to an aspect of the present invention, a resistive path, indicated by bridge resistor 153, is added between internal node 143 and the common mode (ground), and provides a resistance value $R_B$ determined such that an internal voltage $V_{143}$ at internal node 143 is substantially equal to output voltage $V_{OUT}$ generated at the output node 145, whereby substantially zero current flows between output node 145 and internal node 143 through series resistor 155. In the context provided herein the terms "substantially equal" and "substantially zero" are used to indicate that the resistance value $R_B$ is set with the intention of producing zero voltage drop across series resistor 155, although minor variances due, for example, to process mismatch, may cause the resistance $R_B$ to be not exactly equal to $N*R_L$, resulting in a minor current flow (e.g., equal to 5% or less of the current $I_{DAC}$ generated by current source 110). Note that, without bridge resistor 153, nearly all of the $I_{DAC}$ current flows through series resistor 155, which causes a significant voltage difference between internal node 143 and output node 145. By including bridge resistor 153 in line driver 102 with a resistance value that balances the voltages at nodes 143 and 145, even with imperfections due to process variations, only a small fraction of the $I_{DAC}$ current flows through series resistor 155, and the effect is negligible.

The main benefit achieved by the addition of bridge resistor 153 to line driver 102 is that it improves the trans-impedance gain of line driver 102 by a factor of two over the conventional line driver 40 (described above with reference to FIG. 10). In contrast, prior art line driver 40 of U.S. Pat. No. 7,119,611 (see FIGS. 10, 11(A) and 11(B), discussed above) is constructed such that most of the current has to flow through resistor $R_S$, which results not only in a voltage divider, but also a mismatch of $V_{DS}$ between transistors 45 and 47 (see FIG. 10), which results in nonlinear operation. As set forth above, in line driver 40, resistor $R_S$ is a function of output gain in that, when resistor $R_S$ is properly tuned, its resistance value equals $(1+N)*R_L$, which results in a gain value of ½. Returning to line driver 102 (FIG. 1), because the resistance $R_B$ of bridge resistor 153 is set such that substantially zero current passes through series resistor 155, the resistance $R_S$ of series resistor 155 is not part of the output voltage $V_{OUT}$, (i.e., output voltage $V_{OUT}$ is independent from resistance $R_S$ of series resistor 155), which allows adjustment of output resistance $R_{OUT}$ by way of series resistor 155 in manner that is completely independent of the gain.

In one embodiment (i.e., where the resistance $R_F$ of feedback resistor 151 is substantially larger than the resistance of bridge resistor 153), bridge resistor 153 is fabricated to include a resistance that is substantially equal to the value "N" times the expected load resistance $R_L$ (i.e., a resistance value of $R_L N$). For example, when line driver 102 is fabricated such that the aspect ratio between transistor 135 and transistor 130 is equal to 10, and is fabricated to generate a predetermined output voltage $V_{OUT}$ on output node 145 when output node 145 is connected to a transmission line having a resistance value $R_L$ equal to 75Ω, then bridge resistor 153 is fabricated with a resistance value $R_L N$ substantially equal to 750Ω.

Figures 2A, 2B:
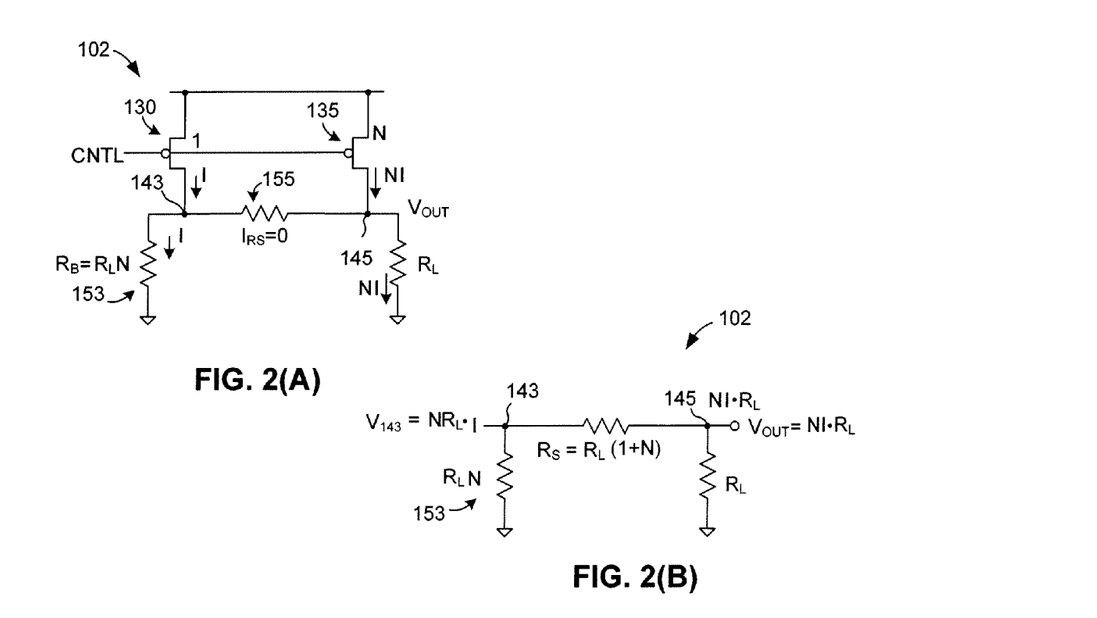
FIGS. 2(A) and 2(B) are circuit diagrams showing simplified representations of the line driver of FIG. 1.

FIGS. 2(A) and 2(B) are simplified representations of line driver 101 when the resistance of bridge resistor 153 equals $R_L N$. As indicated in FIG. 2(A), similar to the prior art circuit, when a unit of current I flows through transistor 130, a current N*I flows through transistor 135. The difference between output driver 101 and prior art driver 40 (FIG. 10) is that all of the current I through transistor 130 flows through bridge resistor 153, which develops a voltage drop of $I*R_L N$ at internal node 143. Similarly, all of the current NI through transistor 135 flows into load resistor $R_L$, which develops an output voltage $V_{OUT}$ that is equal to $NI*R_L$ at output node 145. Because the voltages at both internal node 143 and output node 145 are the same, there is no voltage drop across resistor 155, and there is no net current flow $I_{RS}$ through series resistor 155. As a result, a bridge-type circuit is formed, and output voltage $V_{OUT}$ is the same as the output voltage of transistor 135, and there is no factor two degradation as in prior art line driver 40. That is, series resistance $R_S$ is not in the picture of the output voltage, which makes the adjustment of output resistance $R_{OUT}$, completely independent of the gain. As such, as indicated in FIG. 2(B), series resistor 155 can be set equal to the load resistance value $R_L$ times (1+N), which optimizes output impedance $R_{OUT}$.

The embodiment described above where bridge resistor 153 has the resistance value $R_L N$ assumes the resistance $R_F$ of feedback resistor 151 is much greater than the resistance value $R_L N$. Referring to FIG. 1, in this case the current that flows through feedback resistor $R_F$ is negligible compared to the current passing through bridge resistor 153. However, if the resistance $R_F$ is smaller such that the current through feedback resistor 151 becomes significant, then the resistance value of bridge resistor 153 would have to be increased (i.e., larger than $R_L N$) in order to maintain the objective of minimizing current through series resistor 155. That is, in accordance with an alternative embodiment of the present invention, the resistances of feedback resistor 151 and bridge resistor 153 are matched to form a bridge circuit that maintains voltage $V_{143}$ at internal node 143 equal to the output voltage $V_{OUT}$ (i.e., equal to $I*R_L N$).

According to another aspect of the present invention, series resistor 155 is implemented using a trimmable resistive circuit that is connected between internal node 143 and output node 145, and is controlled by a tuner (control) circuit 160 that is integrally fabricated on IC 100 and generates control signals CN1,CN2 that are transmitted to series resistor 155, whereby series resistance $R_S$ is adjustable such that output impedance $R_{OUT}$ of line driver 102 is set to match an applied load impedance. For example, in the embodiment shown in FIG. 1, series resistance $R_S$ is adjusted to equal $(1+N)*R_L$, whereby output impedance $R_{OUT}$ of line driver 102 is set to match the load impedance $R_L$ of transmission line TL. In other embodiments set forth below, series resistance $R_S$ may be set to another value.

Figure 3:
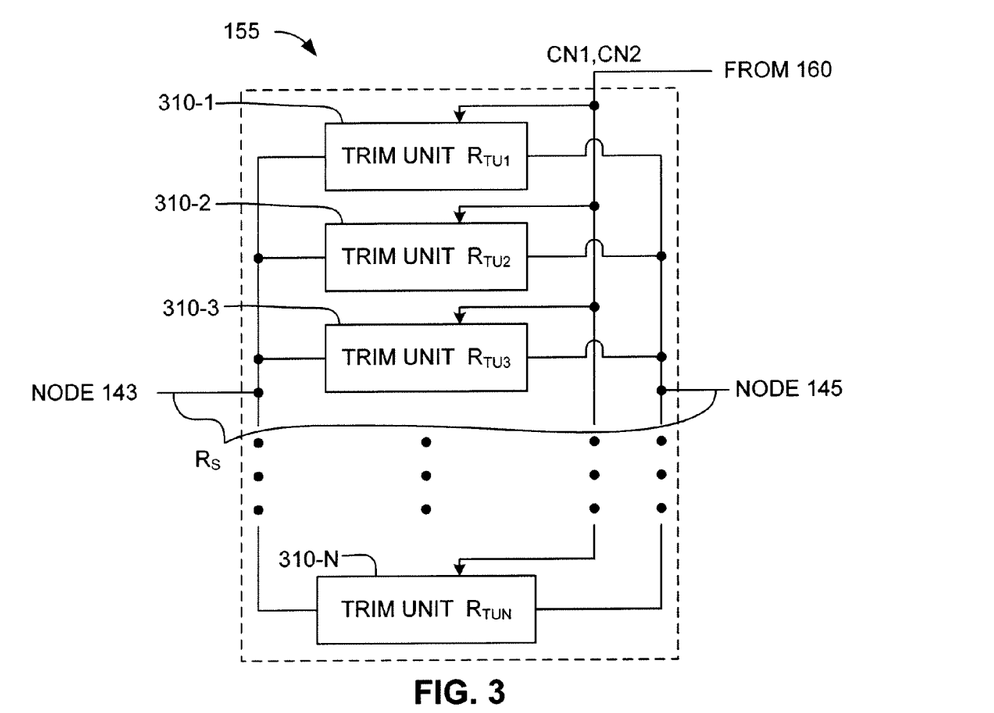
FIG. 3 is a simplified circuit diagram showing a adjustable series resistor of the line driver of FIG. 1 according to a specific embodiment of the present invention.

FIG. 3 is a simplified circuit diagram showing series resistor 155 according to a specific embodiment of the present invention. Series resistor 155 includes parallel trim units 310-1 to 310-N, where each trim unit 310-1 to 310-N provides an associated adjustable (trimmable) resistance $R_{TU1}$ to $R_{TUN}$, respectively, and the combined resistances provided by parallel trim units 310-1 to 310-N produces series resistance $R_S$.

Figure 4:
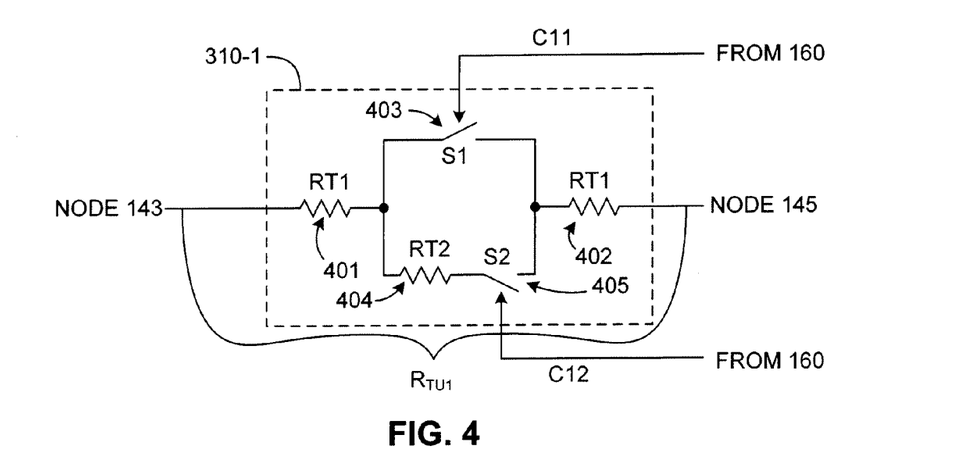
FIG. 4 is a simplified circuit diagram showing a trim unit of the adjustable series resistor of FIG. 3 according to a specific embodiment of the present invention.

FIG. 4 is a circuit diagram showing an exemplary trim unit 310-1, which includes a first resistor 401 and a second resistor 402, each having a resistance RT1, a first switch 403 connected in series with first and second resistors 401 and 402, and a third resistor 404 and second switch 405 connected in parallel with first switch 403. Note that switches S1 and S2 in each unit 310-1 to 310-N are implemented using CMOS transmission gates. Control signals C11 and C12 are transmitted to unit resistance trim unit 310-1 to selectively control switches S1 and S2, thereby providing fine control such that the combined equivalent resistance $R_S$ between internal node 143 and output node 145 is within a predetermined range of the desired series resistance value $R_S$. In the specific embodiment shown in FIG. 3, each parallel trim unit 310-1 to 310-N has a predetermined equivalent resistance at default $(R_S*M)$ that is equal to the total resistance provided by combining resistors 401, 402 and 404 in series (i.e., switch 405 is closed and switch 404 is open at default). When switch 403 (S1) is closed and switch 405 (S2) is opened in response to control signals C11 and C12, respectively, the resistance of unit 310-1 is reduced to the sum of resistors 401 and 402. When both switch 403 (S1) and switch 405 (S2) are opened, unit 310-1 is opened and has a high impedance. By selectively turning on/off switches S1 and S2 of each unit 310-1 to 310-N, various equivalent resistances can be achieved. For example, at default the equivalent resistance may be $R_S*M/N$, with each of the N parallel units 310-1 to 310-N having a default resistance of $R_S*M$. By opening switch S2 for K units (e.g., units 310-1 to 310-K, where K<N), and with switch S1 defaulted open, the equivalent resistance of series resistor 155 becomes $R_S*M/(N-K)$, which is greater than $R_S$ if $M/(N-K)>1$, and less than $R_S$ if $M/(N-K)<1$. Turning on the switch S1 in additional trim units will provide a finer resolution for controlling the resistance $R_S$. In one embodiment, tuner circuit 160 (FIG. 1) includes a logic circuit that generates a pre-selected sequence of control signals CN1,CN2 that on/off switches S1 and S2 in each unit 310-1 to 310-N until the desired resistance $R_S$ is achieved. Note that switches S1 and S2 in each unit 310-1 to 310-N are implemented using CMOS transmission gates.

Figure 5:
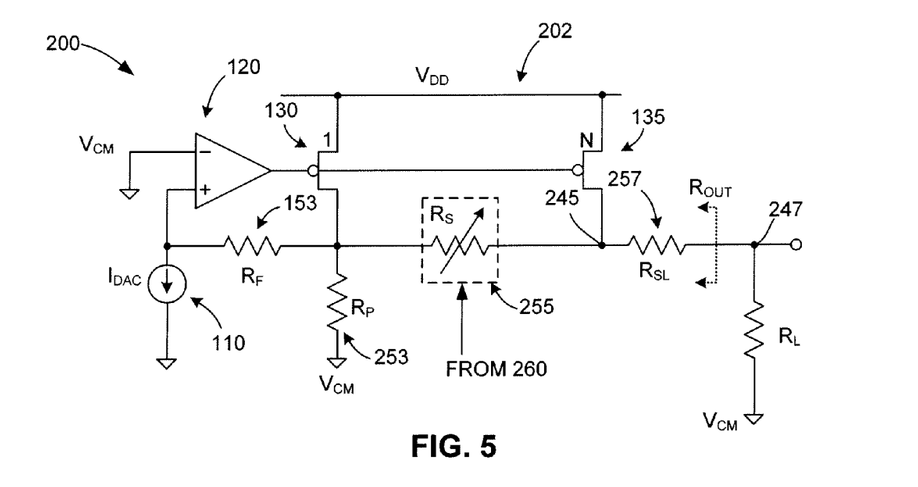
FIG. 5 is a simplified circuit diagram showing a line driver with on-chip termination according to another embodiment of the present invention.

FIG. 5 is a simplified circuit diagram showing an IC 200 including a line driver 202 according to a second embodiment of the present invention. Line driver 202 functions in a manner similar to line driver 102 (see FIG. 1), and elements that are essentially common to both circuits (e.g., current source 110, amplifier 120, transistors 130 and 135, and feedback resistor 153) are identified with the same reference numbers and are not discussed in detail below for brevity. Similar to line driver 102, line driver 202 includes a bridge resistor 253 and a series (adjustable) resistor 255. However, unlike line driver 102, line driver 202 includes an additional series resistor 257 that is connected between a first output node 245 and a second output node 247, which is connected to the associated transmission line (represented by load resistance $R_L$). With the addition of second series resistor 257, the output resistance $R_{OUT}$ is determined as set forth in Equation 4 (below):

$$R_{OUT}=R_{SL}+R_S/(1+N)$$ Eq. 4

Further, the addition of series resistor 257 forms a voltage divider that changes output voltage $V_{OUT}$ as set forth in Equation 5 (below):

$$V_{OUT}=I_{DAC}*R_F*R_L/(R_{SL}+R_L)$$ Eq. 5

To achieve the proper termination and balance, the predetermined number N, load resistance value $R_L$, bridge resistance value $R_B$, and series resistance value $R_{SL}$, are matched such that bridge value $R_B$ is equal to ratio N multiplied by a sum of load resistance value $R_L$ and series resistance value $R_{SL}$, as set forth in Equation 6 (below):

$$R_B=(R_{SL}+R_L)*N$$ Eq. 6

Series resistor 257 is added mainly to facilitate the function of echo cancellation, which if the output is a fully differential circuit (e.g., as described below with reference to FIG. 6), it is fully cancelled at the receiving end.

Figure 6:
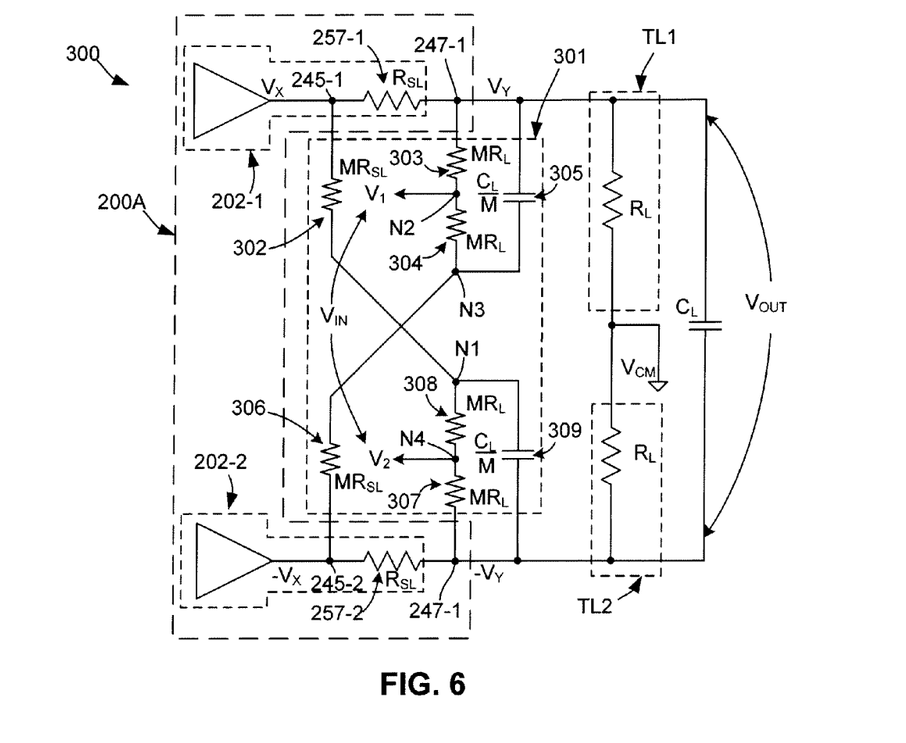
FIG. 6 is a simplified circuit diagram depicting a fully differential circuit utilizing two line drivers shown in FIG. 5.

FIG. 6 depicts a system 300 forming one embodiment of a fully differential circuit in which the echo cancellation function of line driver 202 (FIG. 5) is implemented. System 300 includes an integrated circuit 200A including a first line driver 202-1 and a second line driver 202-2 that are respectively connected to transmission lines TL1 & TL2, and an echo cancellation circuit 301 that is connected between respective output nodes of first and second line drivers 202-1 and 202-2. Note that associated transmission lines TL1 & TL2 are represented by respective load resistances $R_{L1}$ and $R_{L2}$, and form a loading capacitance $C_L$. In this configuration, two identical output drivers 202-1 and 202-2 (i.e., each driver 202-1 and 202-2 is identical to line driver 200 of FIG. 5) are employed to deliver a fully differential output signal at the amplifier output voltages $V_X$, $-V_X$ at output nodes 245-1 and 245-2, respectively, and at load output voltages $V_Y$, $-V_Y$ at output nodes 247-1 and 247-2, respectively. Echo cancellation resistive network (circuit) 301 establishes a resistive divider between $V_X$ and $-V_Y$. In the disclosed embodiment, echo cancellation circuit 301 includes a first resistor 302 connected between (first) output node 245-1 and a first external node N1, a second resistor 303 connected between (second) output node 247-1 and a second external node N2, a third resistor 304 connected between second external node N2 and a third external node N3, a first capacitor 305 connected between (second) output node 247-1 and third external node N3, a fourth resistor 306 connected between (third) output node 245-2 and third external node N3, a fifth resistor 307 connected between (fourth) output node 247-2 and a fourth external node N4, a sixth resistor 308 connected between fourth external node N4 and first external node N1, and a second capacitor 309 connected between (fourth) output node 247-2 and first external node N1. The resistive values of resistors 301-304 and 306-308 are indicated next to each resistor, and are proportional to resistance values $R_{SL}$, and $R_L$ of line drivers 202-1 and 202-2 (as described above), but with a scale up factor M (where M approximately equals 100). The output voltage $V_1$ can be independent of voltage $V_X$ if a full differential signal is present. Similarly, $V_2$ is independent of $V_X$, so the echo cancellation is achieved at input $V_{IN}$. The same scaling factor can be applied to the loading capacitance $C_L$ to achieve the cancellation with wide bandwidth (i.e., capacitors 305 and 309 have the values indicated in FIG. 6).

For good matching termination $R_{OUT}$, needs to be equal to $R_L$ over all process range, this means a tuner is needed to adjust series resistance $R_S$ to achieve the balance indicated in Equation 7 (below):

$$R_{SL}+R_S/(1+N)=R_L \qquad \text{Eq. 7}$$

Equation 7 implies that the resistance of series resistor 255 is equal to the load resistance minus the second series resistance $R_{SL}$, that sum multiplied by one plus the aspect ratio value N, as set forth by the relationship indicated in Equation 8 (below):

$$R_S=(R_L-R_{SL})*(1+N) \qquad \text{Eq. 8}$$

Equation 8 can be rewritten as set forth below in Equations 8-1 and 8-2:

$$R_S+R_{SL}*(1+N)=R_L*(1+N) \qquad \text{Eq. 8-1}$$

$$[R_S/(1+N)]+R_{SL}=R_L \qquad \text{Eq. 8-2}$$

Because load resistance $R_L$ is provided by an external resistor with a resistance value that is independent of process and temperature, and $R_{SL}$ is provided by internal series resistor 257, which has a dependency on process and temperature, a tuner circuit is needed not only to adjust to the desired value of series resistance $R_S$, but also capable of compensating the characteristic difference (such as temperature effect) between the internal resistances (i.e., $R_S$ and $R_{SL}$) and the external resistance (i.e., $R_L$). Equations 8-1 and 8-2 show that all the imperfection such as variations in N and $R_{SL}$ can be compensated by tuning the $R_S$ value.

Figure 7:
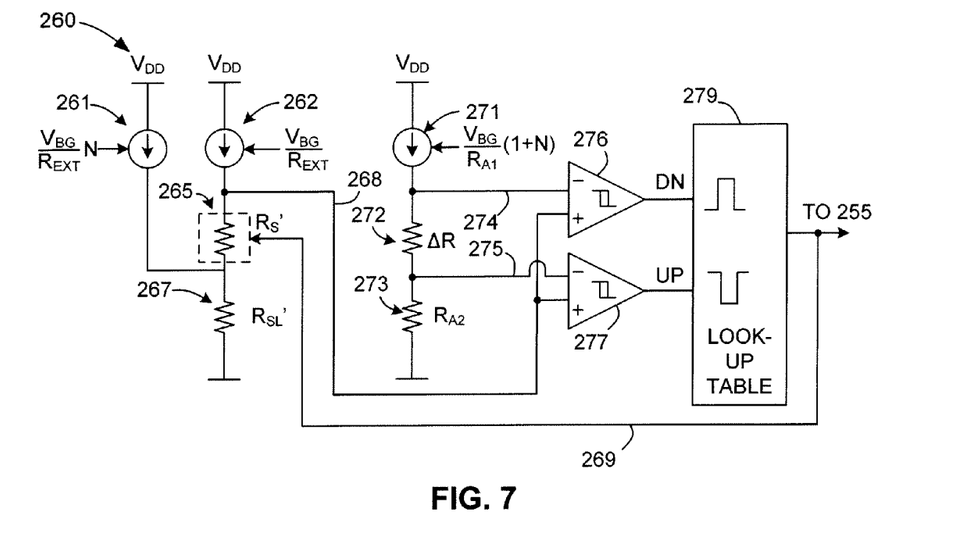
FIG. 7 is a simplified circuit diagram showing a tuner circuit for tuning a series resistor of the line driver of FIG. 5 according to another embodiment of the present invention.
Figure 8A:
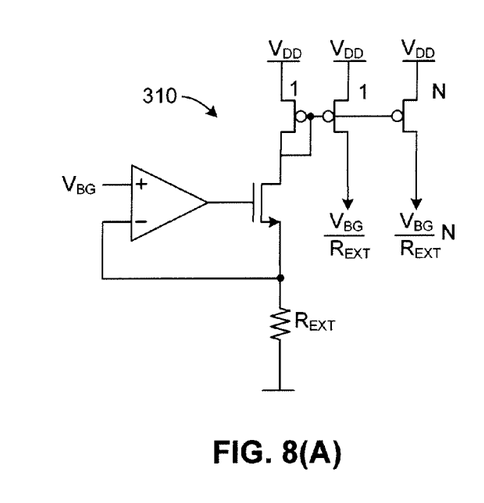
FIGS. 8(A) and 8(B) are circuit diagrams showing circuits for generating reference voltages utilized by the tuner circuit of FIG. 7.
Figure 8B:
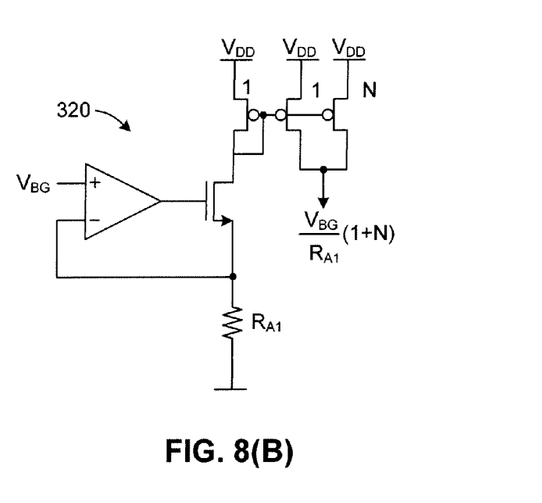

FIG. 7 is a simplified circuit diagram showing a tuner circuit 260 for tuning series resistor 255 to implement Eq. 7 (above). In this circuit, resistance $R_{EXT}$ represents an external resistor (shown in FIG. 8(A)) having the same character (such as temperature effect) as that of load resistance RL, and all the remaining resistances are implemented by internal resistors (i.e., resistors formed on the substrate used to fabricate IC 200, see FIG. 5). As shown in FIG. 8(A), current sources 261 and 262 are controlled by a signal generating circuit 310 that uses a fixed bandgap voltage reference $V_{BG}$ and external resistance $R_{EXT}$, along with P-channel transistors having aspect ratios "1" and "N" as shown, where N is the same aspect ratio value associated with transistors 130 and 135 (see FIG. 5). The current generated by current source 261 is thus N times the current generated by current source 262. Resistors 265 and 267 have resistances $R_{S'}$ and $R_{SL'}$ that are replica versions of resistors 255 and 257 with a scale ratio. The voltage at node 268 is therefore $V_{BG}/R_{EXT}*(R_{S'}+(1+N)*R_{BL'})$. Another current source 271 is controlled by a signal generating circuit 320, shown in FIG. 8(B), where the signal is generated from the bandgap voltage reference $V_{BG}$ over an internal resistance $R_{A1}$ multiplied by a factor (1+N). As indicated in FIG. 7, this current flows to internal resistances $\Delta R$ (resistor 272) and $R_{A2}$ (resistor 273), generating node voltages 274 and 275. Node voltage 275 across resistor 273 is $V_{BG}/R_{A1}*(1+N)*R_{A2}$. Resistor 272 (resistance $\Delta R$) is designed to be a relatively small, so node voltages 274 and 275 are very close with node voltage 274 slightly higher. Two comparators 276 and 277 and a look-up table 279 are employed to generate the control signal on bus 269, which is used to tune both series resistor 255 (FIG. 5) and replica series resistor 265. Comparator 276 is set such that if the node voltage 268 is higher than node voltage 274, it outputs a high pulse "DN" (down) to look-up table 279. Conversely, comparator 277 is set such that if the node voltage 268 is lower than node voltage 274, it outputs a low pulse "UP" to look-up table 279. The DN and UP signals cause look-up control table 279 to adjust the resistance of replica series resistor 265 (resistance $R_{S'}$) to increase or decrease the voltage on node 268. The whole operation achieves a negative feedback loop such that the node voltage 268 is kept in between the node voltages 274 and 275. After cancelling out the $V_{BG}$ term on both sides of resistor 265, the net result of this loop is to generate the function $R_{S'}/(1+N)+R_{SL'}=\beta*R_{EXT}$, where $\beta$ is a constant set by resistances $R_{A2}/R_{A1}$. By properly choosing the scale factor and setting the $\beta$ value such that $\beta*R_{EXT}=(1+N)*R_L$, tuner circuit 260 achieves the replica control that satisfies Equation 8 (above); that is, the output of look-up table 279 tunes series resistor 255 (FIG. 5) to the desired value. In one embodiment, look-up table 279 contains a series of preselected control signal combinations that adjust the resistance of Rs' with the proper resolution. The loop does not need a calibration cycle and does not require a clock signal, so tuner circuit 260 may remain on (active) all the time to adjust for temperature and environment changes. Alternatively, by add-

The invention claimed is:

1. A line driver for generating a predetermined output voltage on an output node of an integrated circuit when the output node is connected to a transmission line having a first resistance value, the line driver comprising:
    means for generating an output control signal in response to a digital data signal,
    a first stage transistor for generating a first current at an internal node in response to the output control signal,
    a second stage transistor for generating a second current at the output node in response to the output control signal, wherein the second stage transistor is constructed such that the second current is a predetermined number times larger than the first current,
    a bridge resistor connected between the internal node and a common mode voltage;
    a first trimmable resistive circuit connected between the internal node and the output node; and
    a control circuit for adjusting a total output resistance value of the line driver by controlling a series voltage across said first trimmable resistive circuit between the internal node and the output node, wherein the control circuit includes:
        a second trimmable resistive circuit for generating a replica series voltage on a predetermined node; and
        means for comparing the replica series voltage with first and second node voltages, and for generating one or more control signals until the replica series voltage is between the first and second node voltages,
        wherein said one or more control signals are simultaneously transmitted to both the first trimmable resistive circuit and the second trimmable resistive circuit, and
        wherein the first and second node voltages are generated such that, when the replica series voltage is between the first and second node voltages, the series voltage across the first trimmable resistive circuit is adjusted such that the total output resistance value is equal to the first resistance value of the transmission line.

2. The line driver according to claim 1, wherein the first trimmable resistive circuit comprises a plurality of parallel trim units, wherein a unit resistance value of each of said plurality of parallel trim units is adjustable such that a combined equivalent resistance of said plurality of parallel trim units is equal to a predetermined resistance value.

3. The line driver according to claim 1, wherein the first trimmable resistive circuit has a resistance value substantially equal to $(1+N)*R_L$, where N denotes the predetermined number, and where $R_L$ denotes the first resistance value of the transmission line.

4. The line driver according to claim 1, further comprising a first series resistor connected to the output node such that the first series resistor is connected between the output node and the transmission line,
    wherein said first series resistor has a third resistance value, and
    wherein the first trimmable resistive circuit has a resistance value substantially equal to $(1+N)*(R_L-R_{SL})$, where N denotes the predetermined number, where $R_L$ denotes the first resistance value of the transmission line, and where $R_{SL}$ denotes the third resistance value of the first series resistor.

5. The line driver according to claim 4, wherein the second trimmable resistive circuit is connected in series with a second series resistor having a replica series resistance that is proportion to the third resistance value of the first series resistor.

6. The line driver according to claim 4, wherein said means for comparing and generating comprises:
    a first comparator for comparing the replica series voltage with the first node voltage,
    a second comparator for comparing the replica series voltage with the second node voltage, and
    a look-up table for storing a series of pre-selected control signal combinations, and for transmitting one of the pre-selected control signal combinations to the first and second trimmable resistive circuits in response to output signals generated by the first and second comparators.

7. The line driver according to claim 1, wherein the bridge resistor has a second resistance value set such that an internal voltage at the internal node is equal to the predetermined output voltage generated at the output node, whereby substantially zero current flows between the output node and the internal node through the first trimmable resistive circuit.

8. A line driver for generating a predetermined output voltage on an output node of an integrated circuit when the output node is connected to a transmission line having a first resistance value, the line driver comprising:
    means for generating an output control signal in response to a digital data signal,
    a first stage transistor for generating a first current at an internal node in response to the output control signal,
    a second stage transistor for generating a second current at the output node in response to the output control signal, wherein the second stage transistor is constructed such that the second current is a predetermined number times larger than the first current,
    a bridge resistor connected between the internal node and a common mode voltage;
    a first trimmable resistive circuit connected between the internal node and the output node;
    a first series resistor connected to the output node such that the first series resistor is connected between the output node and the transmission line; and
    a control circuit for adjusting a total output resistance value of the line driver by controlling a series voltage across said first trimmable resistive circuit between the internal node and the output node, wherein the control circuit includes:
        a second trimmable resistive circuit for generating a replica series voltage on a predetermined node; and
        means for comparing the replica series voltage with first and second node voltages, and for generating one or more control signals until the replica series voltage is between the first and second node voltages,
        wherein said one or more control signals are simultaneously transmitted to both the first trimmable resistive circuit and the second trimmable resistive circuit, and
        wherein the first and second node voltages are generated such that, when the replica series voltage is between the first and second node voltages, the series voltage across the first trimmable resistive circuit is adjusted such that the total output resistance value is equal to the first resistance value of the transmission line.

9. The line driver according to claim 8, wherein said means for comparing and generating comprises:
- a first comparator for comparing the replica series voltage with the first node voltage,
- a second comparator for comparing the replica series voltage with the second node voltage, and
- a look-up table for storing a series of pre-selected control signal combinations, and for transmitting one of the pre-selected control signal combinations to the first and second trimmable resistive circuits in response to output signals generated by the first and second comparators.

10. A line driver for generating a predetermined output voltage on an output node of an integrated circuit when the output node is connected to a transmission line having a first resistance value, the line driver comprising:
- means for generating an output control signal in response to a digital data signal,
- a first stage transistor for generating a first current at an internal node in response to the output control signal,
- a second stage transistor for generating a second current at the output node in response to the output control signal, wherein the second stage transistor is constructed such that the second current is a predetermined number times larger than the first current,
- a bridge resistor connected between the internal node and a common mode voltage;
- a first trimmable resistive circuit connected between the internal node and the output node;
- a first series resistor connected to the output node such that the first series resistor is connected between the output node and the transmission line; and
- a control circuit for adjusting a total output resistance value of the line driver by controlling a series voltage across said first trimmable resistive circuit between the internal node and the output node, wherein the control circuit includes:
  - a second trimmable resistive circuit for generating a replica series voltage on a predetermined node;
  - a first comparator for comparing the replica series voltage with A first node voltage;
  - a second comparator for comparing the replica series voltage with A second node voltage; and
  - a look-up table for storing a series of pre-selected control signal combinations, and for transmitting one of the pre-selected control signal combinations to the first and second trimmable resistive circuits in response to output signals generated by the first and second comparators,
- wherein said one or more control signals are simultaneously transmitted to both the first trimmable resistive circuit and the second trimmable resistive circuit, and
- wherein the first and second node voltages are generated and the first and second comparators are arranged such that, when the replica series voltage is between the first and second node voltages, the series voltage across the first trimmable resistive circuit is adjusted such that the total output resistance value is equal to the first resistance value of the transmission line.

* * * * *

UNITED STATES PATENT AND TRADEMARK OFFICE
CERTIFICATE OF CORRECTION

| | | |
|---|---|---|
| PATENT NO. | : 8,022,736 B2 | Page 1 of 1 |
| APPLICATION NO. | : 12/625249 | |
| DATED | : September 20, 2011 | |
| INVENTOR(S) | : Menping Chang et al. | |

It is certified that error appears in the above-identified patent and that said Letters Patent is hereby corrected as shown below:

Title Page, (57) ABSTRACT, 3$^{rd}$ line, insert --is-- after "resistor".

<u>Column 12</u>
Line 7, amend "proportion" to --proportional--.

<u>Column 14</u>
Line 9, amend "A" to --a--.

<u>Column 14</u>
Line 11, amend "A" to --a--.

Signed and Sealed this
Eighth Day of January, 2013

David J. Kappos
*Director of the United States Patent and Trademark Office*